Feb. 4, 1936.                 W. H. O'BRIEN                 2,029,500
                              COMPOSITE PICTURE
                           Filed Sept. 13, 1933
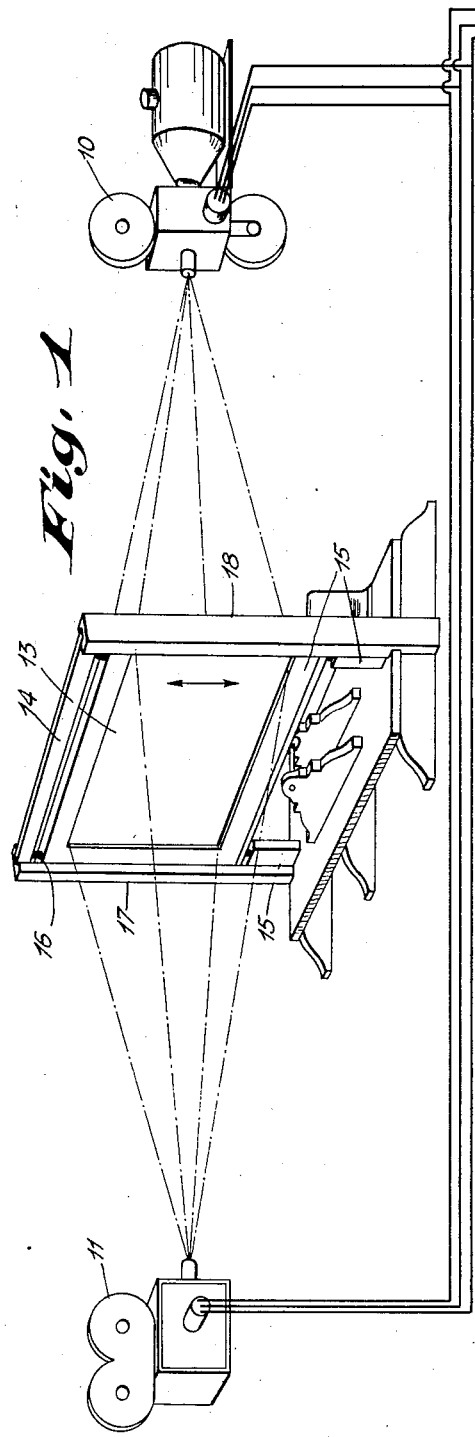
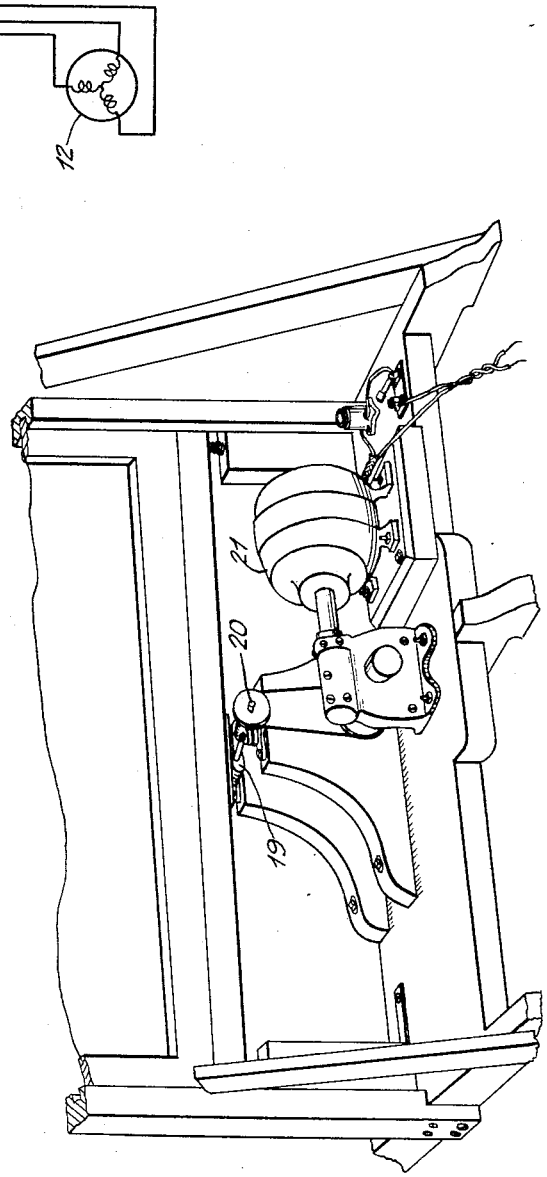
INVENTOR
WILLIS H. O'BRIEN
BY
ATTORNEY Patented Feb. 4, 1936

2,029,500

UNITED STATES PATENT OFFICE 2,029,500

COMPOSITE PICTURE

Willis H. O'Brien, Los Angeles, Calif., assignor to Radio Corporation of America, a corporation of Delaware Application September 13, 1933, Serial No. 689,169

5 Claims. (Cl. 88—16)

This invention relates to the production of composite moving pictures having a projected background component and has for its principal object the provision of an improved apparatus and method of operation for obviating the effect of grain or other surface irregularities in the surface on which the background component is projected.

It is customary in the production of composite motion pictures to interpose a foreground component including actors or other objects between the motion picture camera and a screen upon which a still or moving background component is projected. In the operation of this system, however, difficulty is encountered due to the fact that images of the screen grain or screen surface irregularities are likely to appear in the finished picture. In accordance with this invention, these objectionable images are avoided by the provision of means for imparting an oscillatory movement to the screen during the making of the picture.

The invention will be better understood from the following description when considered in connection with the accompanying drawing, and its scope will be pointed out in the appended claims.

Referring to the drawing:

Fig. 1 illustrates an apparatus arranged in accordance with the invention, and

Fig. 2 illustrates the details of the mechanism whereby the background screen is oscillated or vibrated.

The apparatus includes a background projector 10 and a moving picture camera 11 which are arranged to be operated in synchronism with one another by means of power supplied from an alternating current source indicated at 12. It will be apparent that some conditions of operation may not require synchronous operation of the camera and projector and that they may be operated from separate sources of power or one of them, for example the projector, may be operated manually.

Interposed between the projector 10 and the camera 11 is a background component screen 13 which is suspended between supports 14 and 15 by means of springs 16 each located near one of its corners. It will be noted that the ends of the screen 13 extend into grooves or guideways located in the upright support members 17 and 18 to which the supports 14 and 15 are fastened. This arrangement permits vertical movement of the screen and at the same time maintains it in proper focus with respect to the projector and camera.

For imparting vibratory motion to the screen 13, a rotatable cam 19 mounted on a shaft 20 and arranged to be driven by a motor 21 is provided. The other details of the apparatus are apparent from the drawing and need not be described.

It might be assumed that vibration of the screen would not effectively eliminate the effect of grain and surface irregularities but would tend to produce streak or scratch images in the finished picture. It has been found after long and satisfactory use of the apparatus, however, that no images of the grain or other irregularities of the screen surface are apparent in the finished picture. It will of course be understood that the foreground component is interposed between the camera and screen at any suitable point and that any suitable mechanism may be utilized to move the screen.

Having thus described my invention, I claim:

1. The method of eliminating screen surface irregularity effects in motion pictures which includes projecting a background picture component on a screen, vibrating said screen transversely of the direction in which said component is projected, and taking a series of photographs of said projected image while the screen is vibrating.

2. The combination of a projector, a motion picture camera, a screen interposed between said projector and camera, and means for vibrating said screen in its own plane during the time the camera is photograping an image on the said screen.

3. The method of composite motion picture photography comprising projecting a background picture component on a screen, providing a foreground picture component in front of said screen, simultaneously taking a series of photographs of both of said components, and vibrating the said screen in its own plane during the time each photograph is being taken.

4. The method of eliminating grain effects in motion picture photography comprising projecting a picture on a screen, taking a series of photographs of the said picture, and vibrating the said screen in its own plane while the projected picture is being photographed.

5. In combination a projector, a motion picture camera, a screen interposed between said projector and camera, and means for vibrating said screen in its own plane during the time the camera is taking a series of photographs of the picture projected thereon by the said projector.

WILLIS H. O'BRIEN.